(12) United States Patent
Palmer

(10) Patent No.: US 12,271,620 B2
(45) Date of Patent: Apr. 8, 2025

(54) TECHNIQUES FOR IMPROVED WRITE PERFORMANCE MODES

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/521,693

(22) Filed: Nov. 28, 2023

(65) Prior Publication Data

US 2024/0176534 A1    May 30, 2024

Related U.S. Application Data

(60) Provisional application No. 63/385,491, filed on Nov. 30, 2022.

(51) Int. Cl.
*G06F 3/06* (2006.01)

(52) U.S. Cl.
CPC .......... *G06F 3/0655* (2013.01); *G06F 3/0604* (2013.01); *G06F 3/061* (2013.01); *G06F 3/0679* (2013.01)

(58) Field of Classification Search
CPC ...... G06F 3/0655; G06F 3/0604; G06F 3/061; G06F 3/0679
USPC ....................................................... 711/154
See application file for complete search history.

(56) References Cited

U.S. PATENT DOCUMENTS

| | | | | |
|---|---|---|---|---|
| 2017/0068451 A1* | 3/2017 | Kenan | .................... | G06F 3/0659 |
| 2018/0364934 A1* | 12/2018 | Bahirat | .................... | G01K 7/425 |
| 2019/0361516 A1* | 11/2019 | Bhattacharyya | ...... | G06F 3/0625 |
| 2020/0183622 A1* | 6/2020 | Hubbard | ................. | G06F 3/061 |
| 2020/0201784 A1* | 6/2020 | Palmer | .................... | G06F 21/79 |
| 2021/0271399 A1* | 9/2021 | Pallipadi | ................. | G06F 3/065 |
| 2021/0405899 A1* | 12/2021 | Keshava | ................. | G06F 3/061 |
| 2024/0069803 A1* | 2/2024 | Yang | ..................... | G11C 16/10 |

* cited by examiner

*Primary Examiner* — Than Nguyen
(74) *Attorney, Agent, or Firm* — Holland & Hart LLP

(57) ABSTRACT

Methods, systems, and devices for techniques for improved write performance modes are described. A memory system and a host system may support a high performance mode to write data to the memory system. For example, the host system may provision a dedicated logical unit of the memory system. Upon detecting an urgent situation, the host system may transmit a command to the memory system to enter the high performance mode. In response to the command, the memory system may abort ongoing operations, such as internal memory management operations. Additionally, the host system and the memory system may configure operational parameters to increase the speed of write operations, such as a trim set for writing data to the logical unit, a bit rate of data transfer between the host system and the memory system, clock speeds of the memory system, or a combination thereof.

20 Claims, 7 Drawing Sheets

TECHNIQUES FOR IMPROVED WRITE PERFORMANCE MODES

CROSS REFERENCE

The present application for patent claims the benefit of U.S. Provisional Patent Application No. 63/385,491 by PALMER et al., entitled "TECHNIQUES FOR IMPROVED WRITE PERFORMANCE MODES," filed Nov. 30, 2022, assigned to the assignee hereof, and expressly incorporated by reference in its entirety herein.

FIELD OF TECHNOLOGY

The following relates to one or more systems for memory, including techniques for improved write performance modes.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
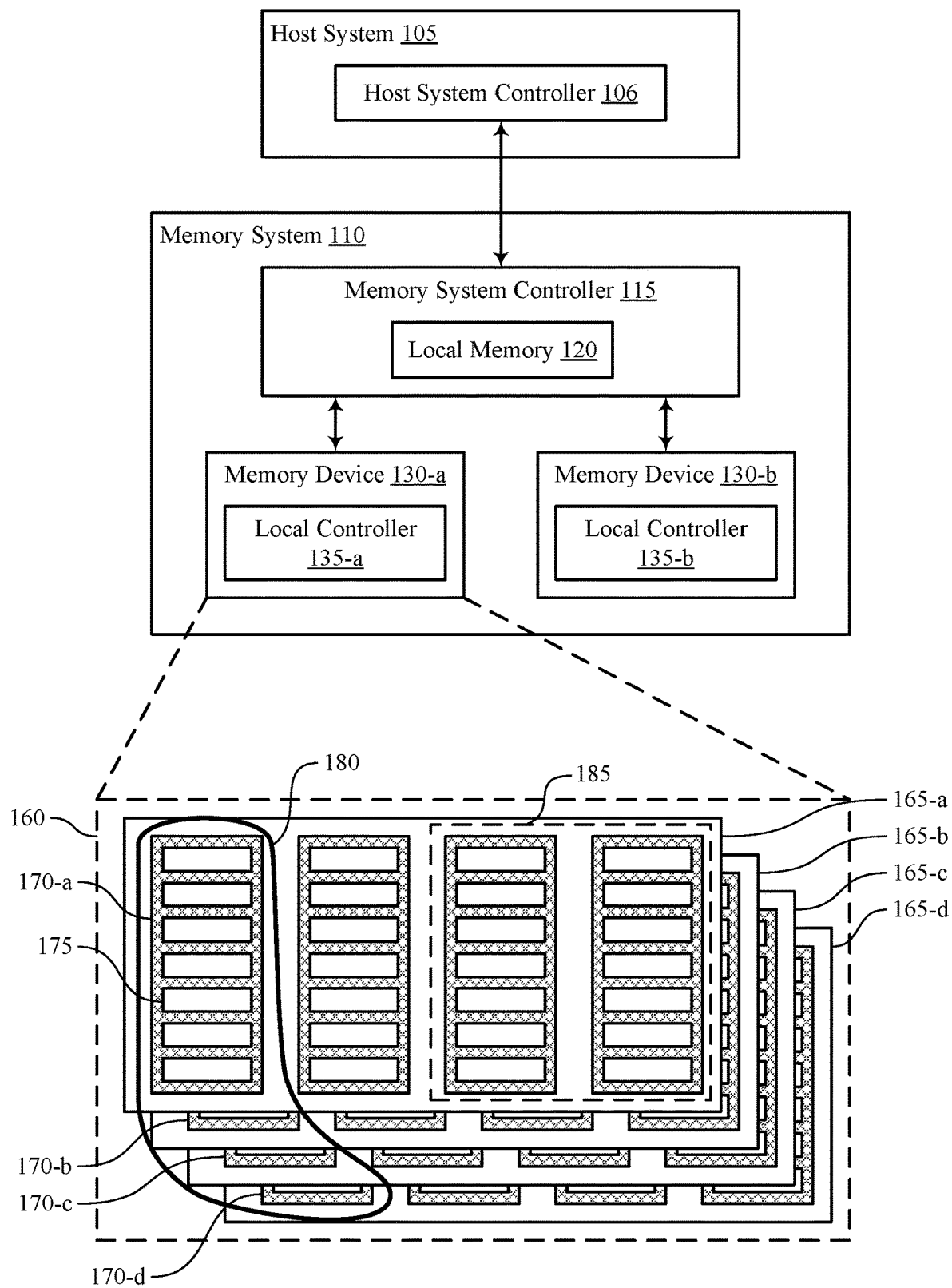
FIG. 1 illustrates an example of a system that supports techniques for improved write performance modes in accordance with examples as disclosed herein.

Some systems, such as a vehicle system, may include a memory system and a host system coupled with the memory system. In some examples, the host system may detect an urgent situation, such as detecting that an accident (e.g., a collision of the vehicle system with an exterior object, such as another vehicle) is probable or unavoidable. In such examples, state parameters monitored by the host system, such as vehicle speed, vehicle direction, video feed, environmental conditions, and so on, may provide valuable insight into causes of the urgent situation, or may allow for increased accuracy of reconstruction of the situation. Accordingly, the host system may attempt to quickly store the state parameters in the memory system prior to the situation (e.g., because the situation may result in a sudden loss of power to the host system, the memory system, or both). However, the memory system and the host system may not be configured for sufficiently quick storage operations, for example due to limited storage space of the memory system, ongoing operations of the memory system, or both.

As described herein, a memory system and a host system may support a high performance mode to increase the speed at which data (e.g., state parameters associated with a vehicle system) may be written to the memory system. For example, the host system may provision a dedicated logical unit of the memory system, which may be reserved to store data during the high performance mode. Upon detecting an urgent situation, the host system may transmit a command to the memory system to enter the high performance mode. In response to the command, the memory system may abort ongoing operations, such as pending access operations from the host system, internal memory management operations, or both. Additionally, the host system and the memory system may configure operational parameters to increase the speed of write operations, such as by adjusting a trim set for writing data to the logical unit, increasing a bit rate of data transfer between the host system and the memory system, increasing clock speeds of the memory system, or a combination thereof. Accordingly, the host system and the memory system may quickly store state parameters in the memory system prior to the urgent situation.

In addition to applicability in memory systems as described herein, techniques for improved write performance modes may be generally implemented to improve the performance of various electronic devices and systems (including artificial intelligence (AI) applications, augmented reality (AR) applications, and virtual reality (VR) applications, among others). Some electronic device applications, including high-performance applications such as AI, AR, and VR, may be associated with relatively high processing requirements to satisfy user expectations. As such, increasing processing capabilities of the electronic devices or systems by decreasing response times, improving power consumption, reducing complexity, increasing data throughput or access speeds, decreasing communication times, or increasing memory capacity or density, among other performance indicators, may improve user experience or appeal.

Implementing the techniques described herein may improve the performance of electronic devices by provisioning a dedicated logical unit of the memory system, detecting an urgent situation, and transmitting a command to the memory system to enter the high performance mode. In response to the command, the memory system may abort ongoing operations, such as pending access operations from the host system, internal memory management operations, or both, which may decrease processing or latency times, improve response times, or otherwise improve user experience, among other benefits.

Figure 2:
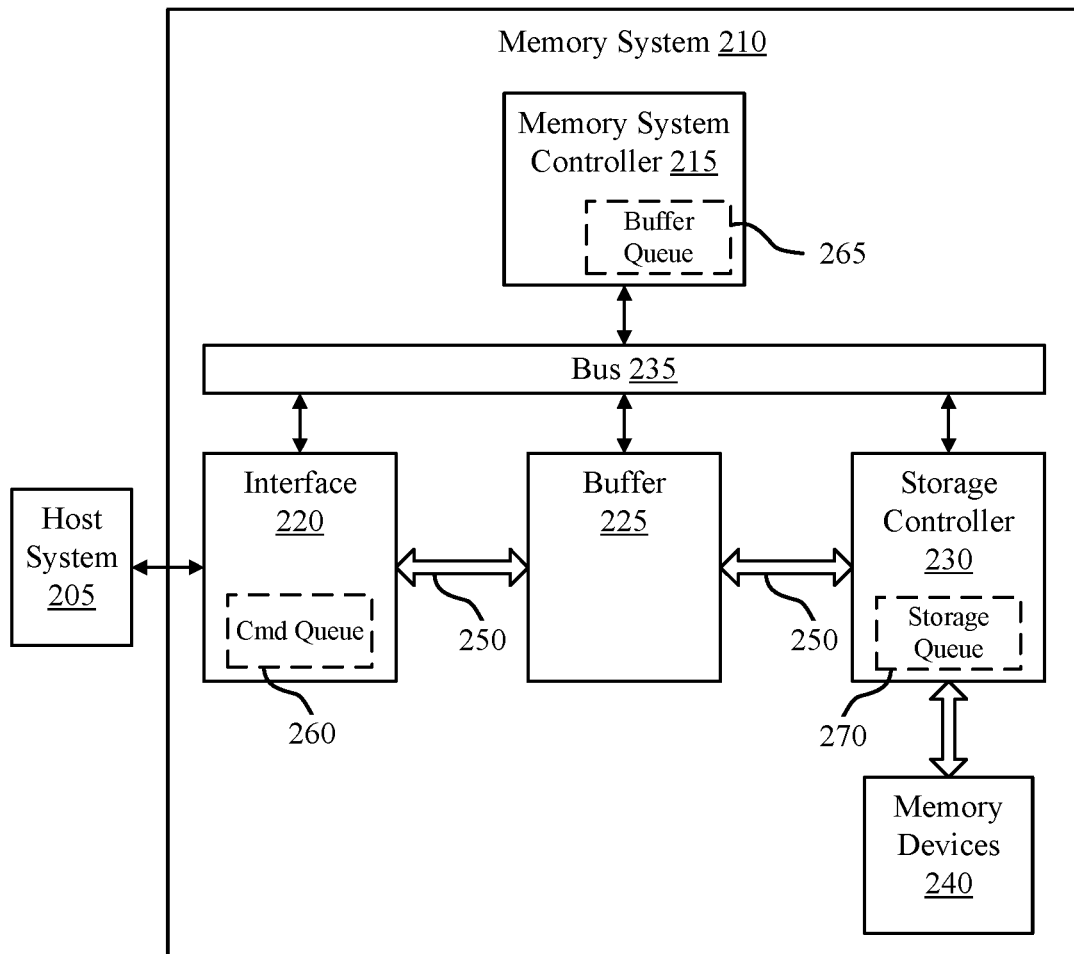
FIG. 2 illustrates an example of a system that supports techniques for improved write performance modes in accordance with examples as disclosed herein.

Features of the disclosure are initially described in the context of systems, devices, and circuits with reference to FIGS. 1 through 2. Features of the disclosure are described in the context of process flows with reference to FIGS. 3 through 4. These and other features of the disclosure are further illustrated by and described in the context of an apparatus diagram and flowchart that relate to techniques for improved write performance modes with reference to FIGS. 5 through 7.

FIG. 1 illustrates an example of a system 100 that supports techniques for improved write performance modes in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IOT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support techniques for improved write performance modes. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some examples, the memory system 110 may support one or more logical units 185. A logical unit 185 may include a grouping of memory cells, such as one or more blocks 170, one or more virtual blocks 180, or both. The host system 105 may support provisioning a logical unit by transmitting a command to the memory system 110 indicating a size of the logical unit, an identifier of the logical unit, such as a logical unit number (LUN), and other parameters (e.g., as described by an appropriate interface, such as a UFS interface or SCSI interface). The memory system 210 may associate a quantity or storage space with the LUN, and may store metadata associated with the logical unit to the storage space of the logical unit.

In some cases, a memory system 110 and a host system 105 may support a high performance mode to increase the speed at which data (e.g., state parameters associated with a vehicle system) may be written to the memory system 110 (e.g., to a logical unit 185). For example, the host system 105 may provision a dedicated logical unit 185 of the memory system 110, which may be reserved to store data during the high performance mode. Upon detecting an urgent situation, the host system 105 may transmit a command to the memory system 110 to enter the high performance mode. In response to the command, the memory system 110 may abort ongoing operations, such as pending access operations from the host system 105, internal memory management operations, or both. Additionally, the host system 105 and the memory system 110 may configure operational parameters to increase the speed of write operations, such as by adjusting a trim set for writing data to the logical unit 185, increasing a bit rate of data transfer between the host system 105 and the memory system 110, increasing clock speeds of the memory system 110, or a combination thereof. Accordingly, the host system 105 and the memory system 110 may quickly store state parameters in the memory system prior to the urgent situation.

FIG. 2 illustrates an example of a system 200 that supports techniques for improved write performance modes in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210) and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some cases, a memory system 210 and a host system 205 may support a high performance mode to increase the speed at which data (e.g., state parameters associated with a vehicle system) may be written to the memory system 210. For example, the host system 205 may provision a dedicated logical unit of the memory system 210, which may be reserved to store data during the high performance mode. Upon detecting an urgent situation, the host system 205 may transmit a command to the memory system 210 to enter the high performance mode. In response to the command, the memory system 210 may abort ongoing operations, such as pending access operations from the host system 205 (e.g., operations associated with commands stored in the command queue 260), internal memory management operations, or both. Additionally, the host system 205 and the memory system 210 may configure operational parameters to increase the speed of write operations, such as by adjusting a trim set for writing data to the logical unit, increasing a bit rate of data transfer between the host system 205 and the memory system 210, increasing clock speeds of the memory system 210, or a combination thereof. Accordingly, the host system 205 and the memory system 210 may quickly store state parameters in the memory system 210 prior to the urgent situation.

Figure 3:
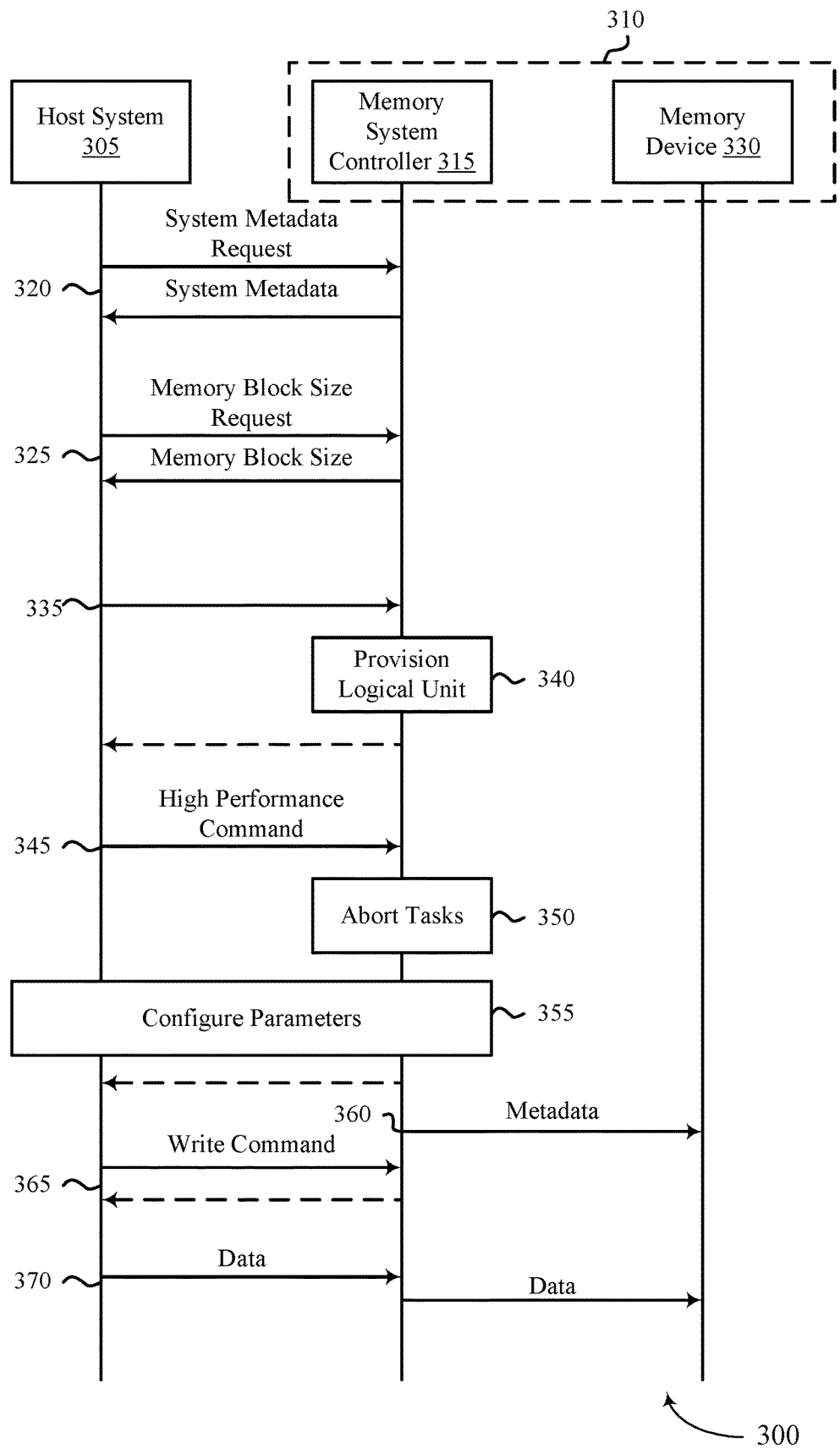
FIG. 3 illustrates an example of a process flow that supports techniques for improved write performance modes in accordance with examples as disclosed herein.

FIG. 3 illustrates an example of a process flow 300 that supports techniques for improved write performance modes in accordance with examples as disclosed herein. In some examples, process flow 300 may be implemented by aspects of the systems 100 and 200. The process flow 300 may include operations performed by a host system 305 and a memory system 310, which may be examples of the host system 105, 205 and the memory system 110, 210 as described with reference to FIGS. 1 and 2. For example, the memory system 310 may include a memory system controller 315, and one or more memory devices 330, which may be examples of the corresponding components described in FIGS. 1 and 2. In the following description of the process flow 300, the operations may be performed in a different order than the order shown. For example, specific operations may also be left out of the process flow 300, or other operations may be added to process flow 300.

The process flow 300 may illustrate an example of provisioning a logical unit of the memory system 310 for use in a high performance mode to quickly store data from the host system 305. For example, the host system 305 may detect an emergency condition, such as an impending vehicle crash or other condition which may remove power from the memory system 310. To preserve high-value data (e.g., video feeds, vehicle attributes such as speed, wheel orientation), the host system 305 may instruct the memory system 310 to provision a dedicated logical unit to store the high value data. Upon detecting the emergency condition, the host system 305 may transmit a command to the memory system 310 to enter the high performance mode. The host system 305 and the memory system 310 may configure one or more parameters to increase the speed at which the high-value data may be stored, and the memory system 310 may store the high value data to the provisioned logical unit.

The process flow 300 may include communicating a request for metadata of the memory system 310. For example, at 320, the host system 305 may transmit a command to the memory system 310 to retrieve metadata associated with the memory system 310. Upon receiving the request, the memory system 310 may retrieve the metadata and transmit the metadata to the host system 305 (e.g., as a response to the request).

The metadata may include indications of properties of the memory system 310, such as an identifier indicating class or type of the memory system 310, an identifier unique to the memory system 310, or both. For example, the metadata may include a device descriptor of the memory system 310. The metadata may further include an indication of whether the memory system supports the high performance mode, in addition to a default mode. For example, the metadata may include a flag (e.g., a bit of the device descriptor) which may be asserted if the memory system 310 supports the high performance mode.

The process flow 300 may include communicating a request for a size of data associated with a block of memory cells of the memory system 310. For example, at 325, the host system 305 may transmit a command to the memory system 310 to retrieve an indication of a size of a block of memory cells of a memory device 330 of the memory system 310 (e.g., an amount of data which may be stored in an SLC block of memory cells of the memory device 330). In some cases, the indication may include a geometry descriptor associated with the memory device 330. Upon receiving the command, the memory system 310 may transmit the indication to the host system 305.

The process flow 300 may include communicating a command to provision a logical unit of the memory system 310. For example, at 335, the host system 305 may transmit the command to the memory system 310. The command may include an indication of the storage size of the logical unit. In some cases, the host system 305 may select the storage size to be an integer multiple of the size of data communicated at 325. That is, the storage size may be an integer quantity of blocks of memory cells of the memory device 330.

In some cases, the host system 305 may also transmit a second command to write metadata to the logical unit, along with the metadata itself, to the memory system 310. The metadata may include an address (e.g., a logical address range) for the logical unit, as well as an indication that the logical unit supports the high performance mode. In some cases, the metadata may include or may be an example of a unit descriptor for the logical unit. The host system 305 may transmit the command and the second command separately, or the host system 305 may transmit a single command which may instruct the memory system 310 to provision the logical unit and to write the metadata to the logical unit.

The process flow 300 may include provisioning a logical unit. For example, at 340, the memory system 310 may provision the logical unit indicated by the command communicated at 335. In some cases, upon provisioning the logical unit, the memory system 310 may transmit an acknowledgment (e.g., an ACK) to the host system 305 that the logical unit was successfully provisioned.

To provision the logical unit, the memory system 310 may identify a set of blocks of memory cells (e.g., SLC blocks of memory cells) of the memory device 330 for the logical unit. The quantity of the set of blocks of memory cells may correspond to the storage size indicated by the command communicated at 335. Upon identifying the set of blocks of memory cells, the memory system 310 may erase each block of the set and allocate each block of the set to the logical unit. In some cases, as part of allocating the blocks of the set, the memory system may configure memory cells of the block to each store a single bit of data (e.g., the memory system 310 may configure each block as an SLC block). Additionally, the memory system 310 may adjust parameters associated with storing data to the set of blocks, such as logic state voltages, access currents, access speed, or a combination thereof (e.g., trim settings). In some cases, the set of blocks may be an example of a one or more virtual blocks. For example, the set of blocks may include one or more blocks spread across multiple memory dies, multiple memory devices 330, or both, each block of a virtual block associated with a same address or identifier within the memory die or memory device 330.

Because the set of blocks may be included in a logical unit which supports the high performance mode, the memory system 310 may refrain from writing other data to the set of blocks (e.g., data associated with other write commands). Additionally, if the physical location of the set of blocks is updated, for example due to wear-leveling, garbage collection, or other background operations of the memory system 310, the memory system 310 may configure the updated set of blocks to support the high performance mode.

The process flow 300 may include communicating a command to enter the high performance mode. For example, at 345, the host system 305 may transmit a command to the memory system 310 to switch from a current mode (e.g., a default mode) and enter the high performance mode. In some cases, the command may be or include or may be an example of an abort task set command, and may include a bit to indicate to the memory system 310 to enter the high performance mode. In some cases, the bit may further indicate to the memory system 310 to suppress transmitting status responses (e.g., acknowledgements) of subsequently received write commands.

The process flow 300 may include aborting tasks. For example, at 350, the memory system 310 may abort one or more tasks. In some cases, aborting the one or more tasks may include interrupting any current operations (e.g., in-flight operations) associated with commands from the host system 305, such as access operations for data stored in the memory device 330. Additionally, the memory system 310 may clear a command queue storing pending commands (e.g., a command queue storing commands from the host system 305 which have not yet been executed).

The memory system 310 may also abort one or more tasks associated with background operations of the memory system 310. For example, the memory system 310 may interrupt any currently ongoing garbage collection operations, data transfer operations (e.g., a data transfer operation involving the logical unit, or a data transfer operation not involving the logical unit), wear-leveling operations, or other memory management operations. For example, if a data transfer operation associated with garbage collection can be aborted without loss of data, the write or read commands to the memory devices associated with the data transfer operation may be aborted. In one example, if one or more blocks subject to a garbage collection operation have been read and the valid data has been written to new blocks, but the one or more original blocks have not been erased, the erase operation may be canceled. By aborting the one or more tasks, the memory system 310 may devote additional resources (e.g., computational resources, data bus bandwidth) to perform operations associated with the high performance mode.

In some examples, the memory system 310 may complete certain tasks prior to aborting the one or more tasks. For example, the memory system 310 may complete an in-process program operation, or the memory system 310 may return data associated with a read command which has already been retrieved to the host system 305.

The process flow 300 may include configuring one or more parameters of the memory system 310. For example, at 355, the host system 305 may adjust parameters associated with transmitting data to the memory system 310, such as a rate of data transfer (e.g., a gear, a bit rate associated with data lanes between the host system 305 and the memory system 310). Additionally, the memory system 310 may adjust parameters associated with communication with the host system 305 and parameters associated with internal operations, such as by increasing one or more clock rates (e.g., clock rates associated with an interface with the host system 305, clock rates associated with transferring and storing data to memory devices). In some examples, upon aborting the tasks at 350 and configuring the parameters at 355, the memory system 310 may transmit a signal to the host system 305 indicating that the memory system 310 has successfully entered the high performance mode.

The process flow 300 may include storing metadata in the memory device 330. For example, at 360, the memory system 310 may store metadata (e.g., one or more pages of data) at a location of the logical unit. The metadata may indicate that the data stored in the logical unit is associated with the high performance mode, and may record various attributes of the high performance mode. For example, the metadata may include a time at which the high performance mode was initiated (e.g., a timestamp), an indication of an expected size of data stored in the logical unit, or both. In some cases, the metadata may be written to a pre-defined or predetermined location, such as a beginning of the logical unit (e.g., a beginning of a block of the logical unit), or other specific location.

The process flow 300 may include communicating a write command. For example, at 365, the host system 305 may transmit a write command to the memory system to store data associated with the high performance mode. The write command may include an indication (e.g., a reserved bit) that the data associated with the write command is associated with the high performance mode. Additionally or alternatively, the write command may include an indication of the size of the data (e.g., the write command may indicate a maximum transfer length). In some cases, upon receiving the write command, the memory system 310 may transmit a signal (e.g., a ready to transfer (RTT) signal) indicating that the memory system 310 may be ready to receive the data.

The process flow 300 may include storing the data associated with the high performance mode. For example, at 370, the host system 305 may transfer the data to the memory system (e.g., to the memory system controller 315 via a host interface), and the memory system 310 may store the data to the logical unit of the memory device 330 (e.g., in one or more memory devices). In some cases, the memory system 310 may store the data using single-level write operations (e.g., SLC program operations). For example, the memory system 310 may perform multiple single level write operations, each writing a respective subset of the data to the logical unit. Additionally, the memory system 310 may store the data using a trim setting corresponding to a high performance trim (e.g., voltage values and program times which program the data quickly relative to other trim settings, but may be associated with weaker data retention).

In some cases, the host system 305 may continue transmitting write commands, and the memory system 310 may continue storing additional data associated with the high performance mode. Additionally or alternatively, the host system 305 may continue transmitting data without transmitting an additional write command, and the memory system 310 may store the received data. For example, the host system 305 and the memory system 310 may operate in a data streaming mode.

The host system 305 may continue writing the data associated with the high performance mode, or copies of the data (e.g., if the entirety of the data has already been written), until the memory system 310 exits the high performance mode and returns to a different mode, such as a default mode. In some cases, the memory system 310 may exit the high performance upon being reset.

Alternatively, the host system 305 may transmit a command to exit the high performance mode. In such cases, the memory system 310 may renew the logical unit associated with the high performance mode. For example, the memory system 310 may transfer data stored in the logical unit to a different location, the memory system 310 may erase the blocks of the logical unit to prepare the logical unit for a subsequent high performance mode, or both. The command to exit the high performance mode may be an example of an unmap command for the logical unit.

Aspects of the process flow 300 may be implemented by a controller, among other components. Additionally or alternatively, aspects of the process flow 300 may be implemented as instructions stored in memory (e.g., firmware stored in a memory coupled with a host system 305 or the memory system 310). For example, the instructions, when executed by a controller (e.g., the controller 315), may cause the controller to perform the operations of the process flow 300.

Figure 4:
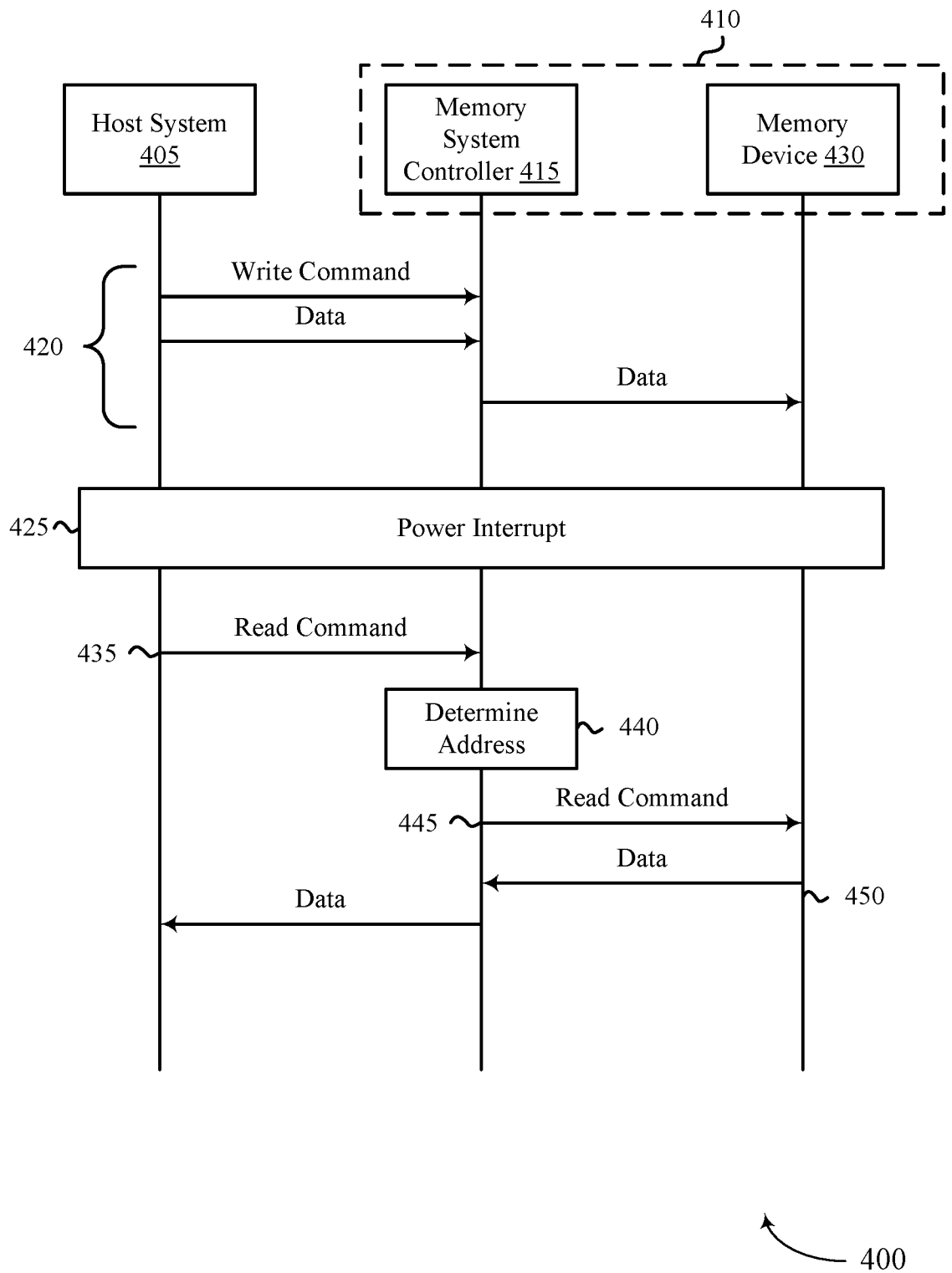
FIG. 4 illustrates an example of a process flow that supports techniques for improved write performance modes in accordance with examples as disclosed herein.

FIG. 4 illustrates an example of a process flow 400 that supports techniques for improved write performance modes in accordance with examples as disclosed herein. In some examples, process flow 400 may be implemented by aspects of the systems 100 and 200. The process flow 400 may include operations performed by a host system 405 and a memory system 410, which may be examples of the host system 105, 205, 305 and the memory system 110, 210, 310 as described with reference to FIGS. 1 through 3. For example, the memory system 410 may include a memory system controller 415, and one or more memory devices 430, which may be examples of the corresponding components described in FIGS. 1 through 3. In the following description of the process flow 400, the operations may be performed in a different order than the order shown. For example, specific operations may also be left out of the process flow 400, or other operations may be added to process flow 400.

The process flow 400 may illustrate an example of retrieving data from a logical unit associated with a high performance mode, such as the logical unit and high performance mode described with reference to FIG. 3. For example, during or after storing data associated with the high performance mode, the host system 405, the memory system 410, or both may undergo a power interruption (e.g., due to an emergency condition, such as a condition which triggered the high performance mode).

As an illustrative example, the process flow 400 may including communicating a write command and associated data. For example, at 420, the host system 405 and the memory system 410 may, as part of a higher performance mode, store data to a logical unit provisioned for the high performance mode, as described in greater detail with reference to FIG. 3.

The process flow 400 may include a power interruption. For example, at 425, the host system 405, the memory system 410, or both may undergo a power interruption. The power interruption may occur as a result of an emergency condition detected by the host system 405. In some cases, the emergency condition may damage the host system 405, the memory system 410, a host interface between the two, or a combination thereof. Accordingly, after the power interruption, the memory system 410 may be coupled with the host system 405 or a separate system to retrieve the data stored at 420.

The process flow 400 may include communicating a read command. For example, at 435, the host system 405 or the separate system may transmit a read command to the memory system 410. The read command may include an indication of the logical unit (e.g., a logical address of the logical unit), or the read command may include an indication to read data associated with the high performance mode.

The process flow 400 may include determining an address. For example, at 440, the memory system 410 may translate the logical address included in the read command received at 425 to a physical address of the logical unit (e.g., using an L2P table). Additionally or alternatively, the memory system may determine the physical address of the logical unit by retrieving the physical address from metadata associated with the logical unit.

The process flow 400 may include retrieving the data associated with the high performance mode. For example, at 445, the memory system 410 (e.g., the memory system controller 415) may issue a read command to the memory device 430. The read command may include the physical address determine at 440. The memory device 430 may retrieve the data indicated by the physical address, and, at 450, may issue the data to memory system controller 415, which may transmit the data to the host system 405 or the separate system.

Aspects of the process flow 400 may be implemented by a controller, among other components. Additionally or alternatively, aspects of the process flow 400 may be implemented as instructions stored in memory (e.g., firmware stored in a memory coupled with a host system 405 or the memory system 410). For example, the instructions, when executed by a controller (e.g., the controller 415), may cause the controller to perform the operations of the process flow 400.

Figure 5:
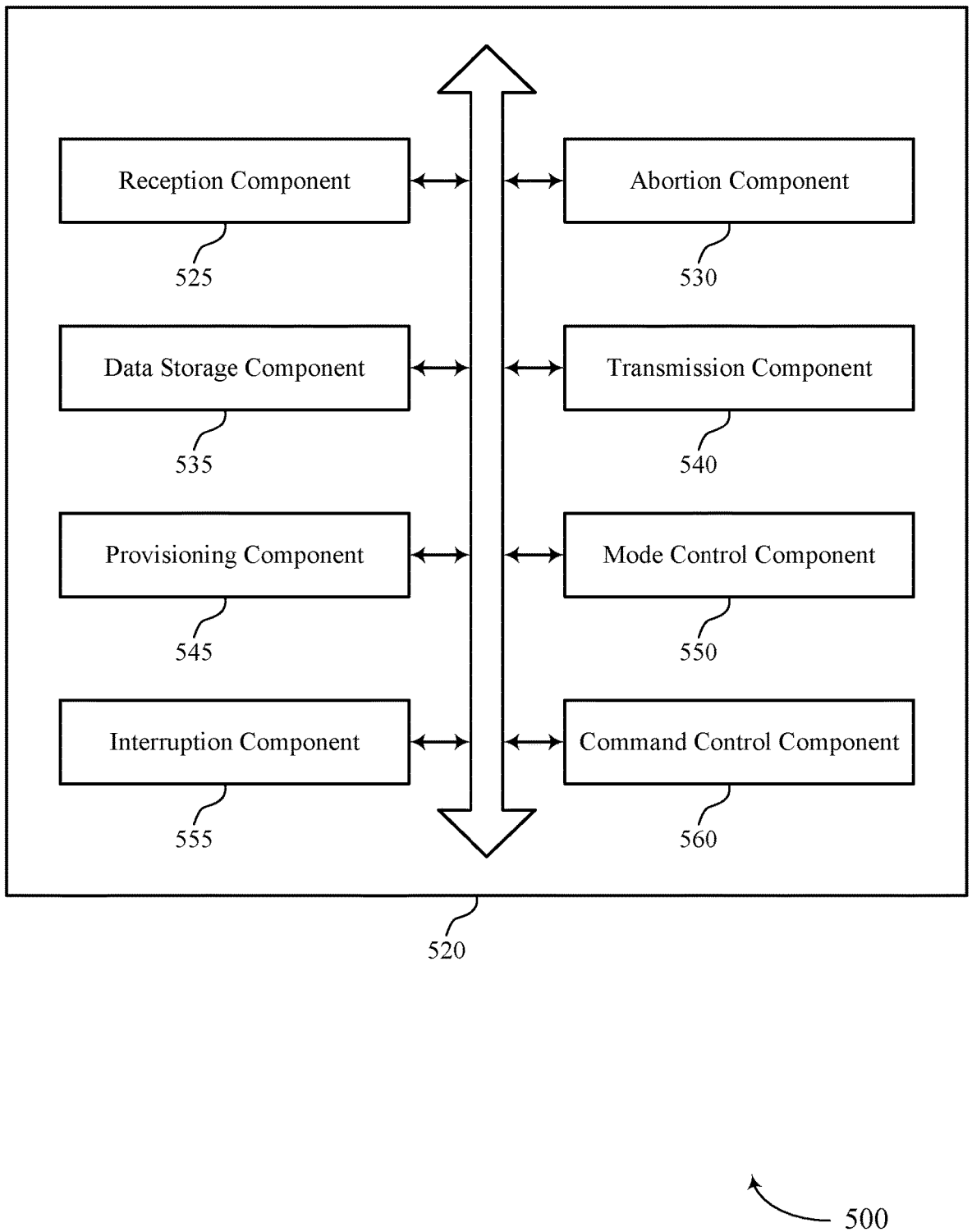
FIG. 5 shows a block diagram of a memory controller that supports techniques for improved write performance modes in accordance with examples as disclosed herein.

FIG. 5 shows a block diagram 500 of a memory controller 520 that supports techniques for improved write performance modes in accordance with examples as disclosed herein. The memory controller 520 may be an example of aspects of a memory controller as described with reference to FIGS. 1 through 4. The memory controller 520, or various components thereof, may be an example of means for performing various aspects of techniques for improved write performance modes as described herein. For example, the memory controller 520 may include a reception component 525, an abortion component 530), a data storage component 535, a transmission component 540, a provisioning component 545, a mode control component 550, an interruption component 555, a command control component 560, or any combination thereof. Each of these components may communicate, directly or indirectly, with one another (e.g., via one or more buses).

The reception component 525 may be configured as or otherwise support a means for receiving, at a memory system while operating in a first performance mode, a command associated with a second performance mode, the memory system including a plurality of non-volatile memory cells arranged in a plurality of logical units. The abortion component 530 may be configured as or otherwise support a means for aborting, at the memory system and based at least in part on the command, one or more memory management operations associated with first data stored in the plurality of non-volatile memory cells. In some examples, the reception component 525 may be configured as or otherwise support a means for receiving, at the memory system while operating in the second performance mode, a write command and second data associated with the write command. The data storage component 535 may be configured as or otherwise support a means for writing the second data associated with the write command to a logical unit associated with the second performance mode.

In some examples, the mode control component 550 may be configured as or otherwise support a means for modifying, for operating in the second performance mode, one or more parameters associated with a latency of write operations for the memory system.

In some examples, the one or more parameters include a trim associated with the logical unit, a bit rate associated with data transferred from a host system, a clock rate of the memory system, or any combination thereof.

In some examples, the mode control component 550 may be configured as or otherwise support a means for writing metadata to the logical unit, the metadata including an indication that the logical unit stores the second data associated with the second performance mode.

In some examples, the metadata further includes a timestamp associated with the second data.

In some examples, the reception component 525 may be configured as or otherwise support a means for receiving, after writing the second data, third data associated with the write command. In some examples, the data storage component 535 may be configured as or otherwise support a means for writing the third data associated with the write command to the logical unit associated with the second performance mode.

In some examples, the write command includes a bit indicating that the second data is associated with the second performance mode.

In some examples, the bit indicating that the second data is associated with the second performance mode further indicates the memory system to suppress transmitting a status response associated with the write command.

In some examples, the bit indicating that the second data is associated with the second performance mode further indicates a size of the second data.

In some examples, the interruption component 555 may be configured as or otherwise support a means for interrupting an operation associated with a second command of one or more second commands received from a host system. In some examples, the command control component 560 may be configured as or otherwise support a means for clearing a command queue of the memory system associated with the one or more second commands.

In some examples, to support aborting the one or more memory management operations, the interruption component 555 may be configured as or otherwise support a means for interrupting a garbage collection operation, a data transfer operation, a wear-leveling operation, or a combination thereof.

In some examples, the command includes a field indicating the second performance mode.

In some examples, the controller is configured to write respective subsets of the second data associated with the write command to the logical unit using single-level write operations.

In some examples, the reception component 525 may be configured as or otherwise support a means for receiving, at a memory system, a request for metadata associated with the memory system, where the memory system includes a plurality of non-volatile memory cells arranged in a plurality of logical units. The transmission component 540 may be configured as or otherwise support a means for transmitting the metadata to a host system, the metadata including an indication that the memory system supports a first performance mode and a second performance mode that is associated with reduced write latency than the first performance mode. In some examples, the reception component 525 may be configured as or otherwise support a means for receiving a command including an indication of a storage size associated with the second performance mode. The provisioning component 545 may be configured as or otherwise support a means for provisioning a logical unit of the memory system for the second performance mode with the storage size.

In some examples, the reception component 525 may be configured as or otherwise support a means for receiving a second command to write second metadata associated with the second performance mode. In some examples, the data storage component 535 may be configured as or otherwise support a means for writing the second metadata to the logical unit.

In some examples, to support provisioning the logical unit, the provisioning component 545 may be configured as or otherwise support a means for identifying a plurality of blocks of memory cells corresponding to the storage size. In some examples, to support provisioning the logical unit, the provisioning component 545 may be configured as or otherwise support a means for erasing the plurality of blocks of memory cells, where writing the second metadata to the logical unit is based at least in part on the erasing.

In some examples, the provisioning component 545 may be configured as or otherwise support a means for allocating plurality of blocks of memory cells to the logical unit based at least in part on provisioning the logical unit for writing using single-level cell write operations.

In some examples, the reception component 525 may be configured as or otherwise support a means for receiving a second request for a size of data associated with a block of memory cells of the memory system. In some examples, the transmission component 540 may be configured as or otherwise support a means for transmitting an indication of the size of data to the host system.

In some examples, the indication of the storage size includes a value indicating a quantity of blocks of memory cells of the logical unit.

Figure 6:
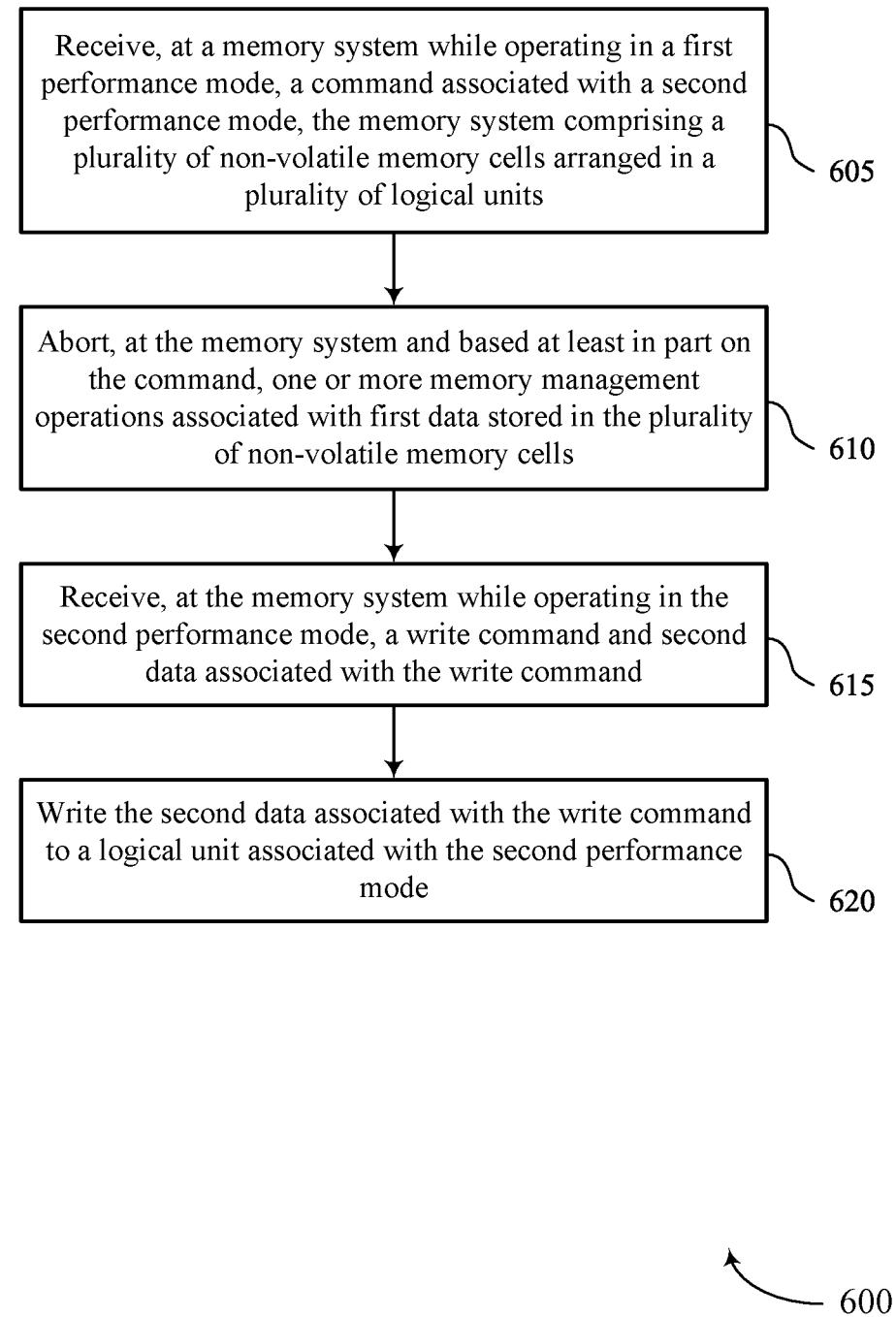
FIGS. 6 and 7 show flowcharts illustrating a method or methods that support techniques for improved write performance modes in accordance with examples as disclosed herein.

FIG. 6 shows a flowchart illustrating a method 600 that supports techniques for improved write performance modes in accordance with examples as disclosed herein. The operations of method 600 may be implemented by a memory controller or its components as described herein. For example, the operations of method 600 may be performed by a memory controller as described with reference to FIGS. 1 through 5. In some examples, a memory controller may execute a set of instructions to control the functional elements of the device to perform the described functions. Additionally, or alternatively, the memory controller may perform aspects of the described functions using special-purpose hardware.

At 605, the method may include receiving, at a memory system while operating in a first performance mode, a command associated with a second performance mode, the memory system including a plurality of non-volatile memory cells arranged in a plurality of logical units. The operations of 605 may be performed in accordance with examples as disclosed herein. In some examples, aspects of the operations of 605 may be performed by a reception component 525 as described with reference to FIG. 5.

At 610, the method may include aborting, at the memory system and based at least in part on the command, one or more memory management operations associated with first data stored in the plurality of non-volatile memory cells. The operations of 610 may be performed in accordance with examples as disclosed herein. In some examples, aspects of the operations of 610 may be performed by an abortion component 530 as described with reference to FIG. 5.

At 615, the method may include receiving, at the memory system while operating in the second performance mode, a write command and second data associated with the write command. The operations of 615 may be performed in accordance with examples as disclosed herein. In some examples, aspects of the operations of 615 may be performed by a reception component 525 as described with reference to FIG. 5.

At 620, the method may include writing the second data associated with the write command to a logical unit associated with the second performance mode. The operations of 620 may be performed in accordance with examples as disclosed herein. In some examples, aspects of the operations of 620 may be performed by a data storage component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory system while operating in a first performance mode, a command associated with a second performance mode, the memory system including a plurality of non-volatile memory cells arranged in a plurality of logical units: aborting, at the memory system and based at least in part on the command, one or more memory management operations associated with first data stored in the plurality of non-volatile memory cells: receiving, at the memory system while operating in the second performance mode, a write command and second data associated with the write command: and writing the second data associated with the write command to a logical unit associated with the second performance mode.

Aspect 2: The method, apparatus, or non-transitory computer-readable medium of aspect 1, further including operations, features, circuitry, logic, means, or instructions, or any combination thereof for modifying, for operating in the second performance mode, one or more parameters associated with a latency of write operations for the memory system.

Aspect 3: The method, apparatus, or non-transitory computer-readable medium of aspect 2, where the one or more parameters include a trim associated with the logical unit, a bit rate associated with data transferred from a host system, a clock rate of the memory system, or any combination thereof.

Aspect 4: The method, apparatus, or non-transitory computer-readable medium of any of aspects 1 through 3, further including operations, features, circuitry, logic, means, or instructions, or any combination thereof for writing metadata to the logical unit, the metadata including an indication that the logical unit stores the second data associated with the second performance mode.

Aspect 5: The method, apparatus, or non-transitory computer-readable medium of aspect 4, where the metadata further includes a timestamp associated with the second data.

Aspect 6: The method, apparatus, or non-transitory computer-readable medium of any of aspects 1 through 5, further including operations, features, circuitry, logic, means, or instructions, or any combination thereof for receiving, after writing the second data, third data associated with the write command and writing the third data associated with the write command to the logical unit associated with the second performance mode.

Aspect 7: The method, apparatus, or non-transitory computer-readable medium of any of aspects 1 through 6, where the write command includes a bit indicating that the second data is associated with the second performance mode.

Aspect 8: The method, apparatus, or non-transitory computer-readable medium of aspect 7, where the bit indicating that the second data is associated with the second performance mode further indicates the memory system to suppress transmitting a status response associated with the write command.

Aspect 9: The method, apparatus, or non-transitory computer-readable medium of any of aspects 7 through 8, where the bit indicating that the second data is associated with the second performance mode further indicates a size of the second data.

Aspect 10: The method, apparatus, or non-transitory computer-readable medium of any of aspects 1 through 9, further including operations, features, circuitry, logic, means, or instructions, or any combination thereof for interrupting an operation associated with a second command of one or more second commands received from a host system and clearing a command queue of the memory system associated with the one or more second commands.

Aspect 11: The method, apparatus, or non-transitory computer-readable medium of any of aspects 1 through 10, where aborting the one or more memory management operations includes operations, features, circuitry, logic, means, or instructions, or any combination thereof for interrupting a garbage collection operation, a data transfer operation, a wear-leveling operation, or a combination thereof.

Aspect 12: The method, apparatus, or non-transitory computer-readable medium of any of aspects 1 through 11, where the command includes a field indicating the second performance mode.

Aspect 13: The method, apparatus, or non-transitory computer-readable medium of any of aspects 1 through 12, where the controller is configured to write respective subsets of the second data associated with the write command to the logical unit using single-level write operations.

Figure 7:
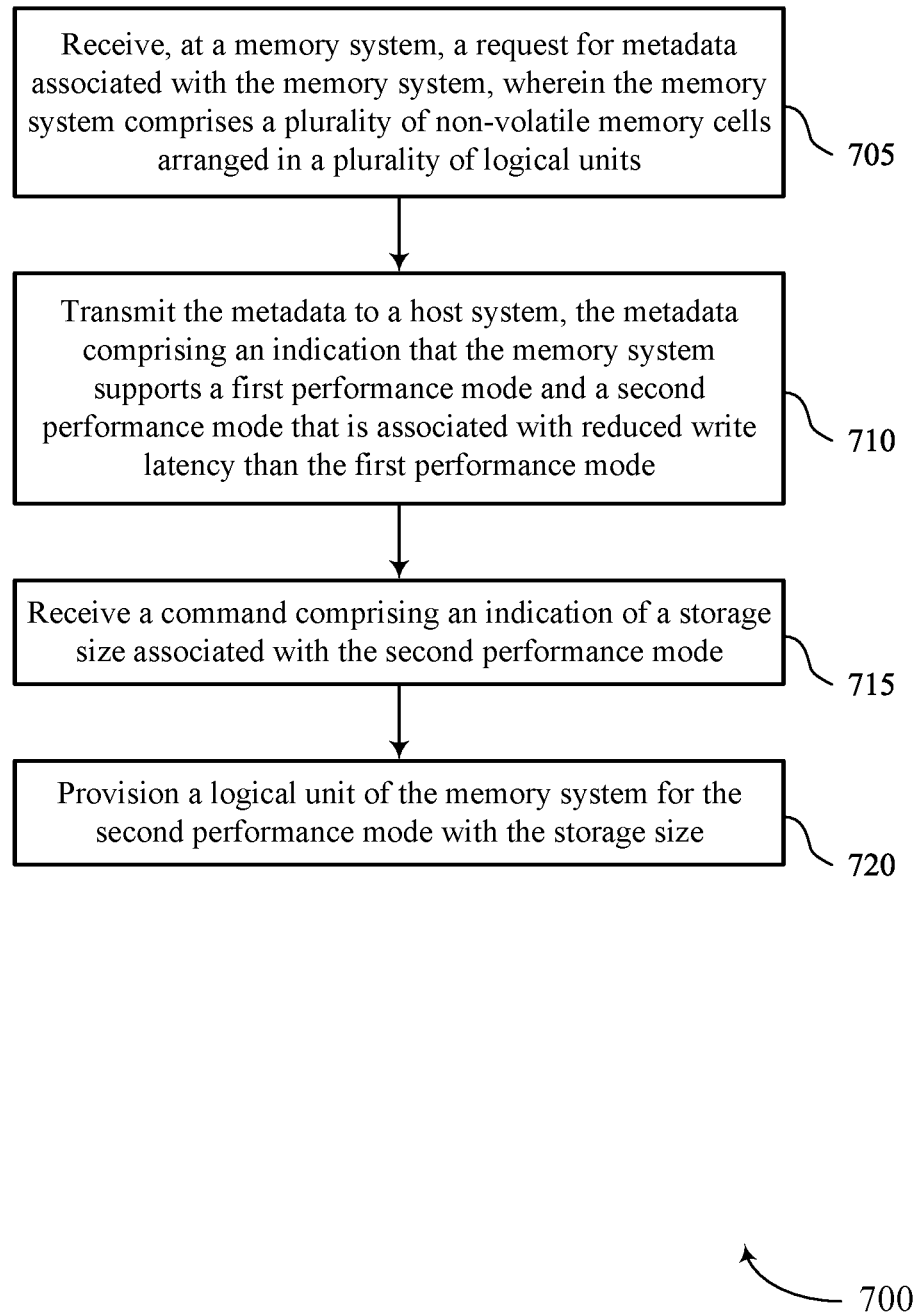

FIG. 7 shows a flowchart illustrating a method 700 that supports techniques for improved write performance modes in accordance with examples as disclosed herein. The operations of method 700 may be implemented by a memory controller or its components as described herein. For example, the operations of method 700 may be performed by a memory controller as described with reference to FIGS. 1 through 5. In some examples, a memory controller may execute a set of instructions to control the functional elements of the device to perform the described functions. Additionally, or alternatively, the memory controller may perform aspects of the described functions using special-purpose hardware.

At 705, the method may include receiving, at a memory system, a request for metadata associated with the memory system, where the memory system includes a plurality of non-volatile memory cells arranged in a plurality of logical units. The operations of 705 may be performed in accordance with examples as disclosed herein. In some examples, aspects of the operations of 705 may be performed by a reception component 525 as described with reference to FIG. 5.

At 710, the method may include transmitting the metadata to a host system, the metadata including an indication that the memory system supports a first performance mode and a second performance mode that is associated with reduced write latency than the first performance mode. The operations of 710 may be performed in accordance with examples as disclosed herein. In some examples, aspects of the operations of 710 may be performed by a transmission component 540 as described with reference to FIG. 5.

At 715, the method may include receiving a command including an indication of a storage size associated with the second performance mode. The operations of 715 may be performed in accordance with examples as disclosed herein. In some examples, aspects of the operations of 715 may be performed by a reception component 525 as described with reference to FIG. 5.

At 720, the method may include provisioning a logical unit of the memory system for the second performance mode with the storage size. The operations of 720 may be performed in accordance with examples as disclosed herein. In some examples, aspects of the operations of 720 may be performed by a provisioning component 545 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for receiving, at a memory system, a request for metadata associated with the memory system, where the memory system includes a plurality of non-volatile memory cells arranged in a plurality of logical units: transmitting the metadata to a host system, the metadata including an indication that the memory system supports a first performance mode and a second performance mode that is associated with reduced write latency than the first performance mode: receiving a command including an indication of a storage size associated with the second performance mode: and provisioning a logical unit of the memory system for the second performance mode with the storage size.

Aspect 15: The method, apparatus, or non-transitory computer-readable medium of aspect 14, further including operations, features, circuitry, logic, means, or instructions, or any combination thereof for receiving a second command to write second metadata associated with the second performance mode and writing the second metadata to the logical unit.

Aspect 16: The method, apparatus, or non-transitory computer-readable medium of aspect 15, where provisioning the logical unit includes operations, features, circuitry, logic, means, or instructions, or any combination thereof for identifying a plurality of blocks of memory cells corresponding to the storage size and erasing the plurality of blocks of memory cells, where writing the second metadata to the logical unit is based at least in part on the erasing.

Aspect 17: The method, apparatus, or non-transitory computer-readable medium of aspect 16, further including operations, features, circuitry, logic, means, or instructions, or any combination thereof for allocating plurality of blocks of memory cells to the logical unit based at least in part on provisioning the logical unit for writing using single-level cell write operations.

Aspect 18: The method, apparatus, or non-transitory computer-readable medium of any of aspects 14 through 17, further including operations, features, circuitry, logic, means, or instructions, or any combination thereof for receiving a second request for a size of data associated with a block of memory cells of the memory system and transmitting an indication of the size of data to the host system.

Aspect 19: The method, apparatus, or non-transitory computer-readable medium of any of aspects 14 through 18, where the indication of the storage size includes a value indicating a quantity of blocks of memory cells of the logical unit.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal: however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
    a controller associated with a memory system comprising a plurality of non-volatile memory cells arranged in a plurality of logical units, the controller configured to cause the apparatus to:
        receive, at the memory system while operating in a first performance mode, a command associated with a second performance mode;
        abort, at the memory system and based at least in part on the command, one or more memory management operations associated with first data stored in the plurality of non-volatile memory cells;
        receive, at the memory system while operating in the second performance mode, a write command and second data associated with the write command; and
        write the second data associated with the write command to a logical unit associated with the second performance mode.

2. The apparatus of claim 1, wherein the controller is further configured to cause the apparatus to:
    modify, for operating in the second performance mode, one or more parameters associated with a latency of write operations for the memory system.

3. The apparatus of claim 2, wherein the one or more parameters comprise a trim associated with the logical unit, a bit rate associated with data transferred from a host system, a clock rate of the memory system, or any combination thereof.

4. The apparatus of claim 1, wherein the controller is further configured to cause the apparatus to:
    write metadata to the logical unit, the metadata comprising an indication that the logical unit stores the second data associated with the second performance mode.

5. The apparatus of claim 4, wherein the metadata further comprises a timestamp associated with the second data.

6. The apparatus of claim 1, wherein the controller is further configured to cause the apparatus to:
    receive, after writing the second data, third data associated with the write command; and
    write the third data associated with the write command to the logical unit associated with the second performance mode.

7. The apparatus of claim 1, wherein the write command comprises a bit indicating that the second data is associated with the second performance mode.

8. The apparatus of claim 7, wherein the bit indicating that the second data is associated with the second performance mode further indicates the memory system to suppress transmitting a status response associated with the write command.

9. The apparatus of claim 7, wherein the bit indicating that the second data is associated with the second performance mode further indicates a size of the second data.

10. The apparatus of claim 1, wherein the controller is further configured to cause the apparatus to:
    interrupt an operation associated with a second command of one or more second commands received from a host system; and
    clear a command queue of the memory system associated with the one or more second commands.

11. The apparatus of claim 1, wherein aborting the one or more memory management operations is configured to cause the apparatus to:
  interrupt a garbage collection operation, a data transfer operation, a wear-leveling operation, or a combination thereof.

12. The apparatus of claim 1, wherein the command comprises a field indicating the second performance mode.

13. The apparatus of claim 1, wherein the controller is configured to write respective subsets of the second data associated with the write command to the logical unit using single-level write operations.

14. An apparatus, comprising:
  a controller associated with a memory system comprising a plurality of non-volatile memory cells arranged in a plurality of logical units, wherein the controller is configured to cause the apparatus to:
  receive, at the memory system, a request for metadata associated with the memory system;
  transmit the metadata to a host system, the metadata comprising an indication that the memory system supports a first performance mode and a second performance mode that is associated with reduced write latency than the first performance mode:
  receive a command comprising an indication of a storage size associated with the second performance mode; and
  provision a logical unit of the memory system for the second performance mode with the storage size.

15. The apparatus of claim 14, wherein the controller is further configured to cause the apparatus to:
  receive a second command to write second metadata associated with the second performance mode; and
  write the second metadata to the logical unit.

16. The apparatus of claim 15, wherein provisioning the logical unit is configured to cause the apparatus to:
  identify a plurality of blocks of memory cells corresponding to the storage size; and
  erase the plurality of blocks of memory cells, wherein writing the second metadata to the logical unit is based at least in part on the erasing.

17. The apparatus of claim 16, wherein the controller is configured to cause the apparatus to:
  allocate plurality of blocks of memory cells to the logical unit based at least in part on provisioning the logical unit for writing using single-level cell write operations.

18. The apparatus of claim 14, wherein the controller is further configured to cause the apparatus to:
  receive a second request for a size of data associated with a block of memory cells of the memory system; and
  transmit an indication of the size of data to the host system.

19. The apparatus of claim 14, wherein the indication of the storage size comprises a value indicating a quantity of blocks of memory cells of the logical unit.

20. A non-transitory computer-readable medium storing code, the code comprising instructions executable by a processor to:
  receive, at a memory system operating in a first performance mode, a command associated with a second performance mode, the memory system comprising a plurality of non-volatile memory cells arranged in a plurality of logical units;
  abort, at the memory system and based at least in part on the command, one or more memory management operations associated with first data stored in the plurality of non-volatile memory cells;
  receive, at the memory system, a write command and second data associated with the write command; and
  write the second data associated with the write command to a logical unit associated with the second performance mode.

* * * * *